(12) United States Patent
McGaw et al.

(10) Patent No.: US 11,741,477 B2
(45) Date of Patent: Aug. 29, 2023

(54) SYSTEM AND METHOD FOR IDENTIFICATION OF A DECISION-MAKER IN A SALES OPPORTUNITY

(71) Applicant: Introhive Services Inc., Fredericton (CA)

(72) Inventors: Peter McGaw, Fredericton (CA); Jody Glidden, Miami Beach, FL (US)

(73) Assignee: Introhive Services Inc., Fredericton (CA)

( * ) Notice: Subject to any disclaimer, the term of this patent is extended or adjusted under 35 U.S.C. 154(b) by 212 days.

(21) Appl. No.: 17/017,652

(22) Filed: Sep. 10, 2020

(65) Prior Publication Data
US 2021/0073824 A1    Mar. 11, 2021

Related U.S. Application Data

(60) Provisional application No. 62/898,423, filed on Sep. 10, 2019.

(51) Int. Cl.
| | |
|---|---|
| *G06Q 30/00* | (2023.01) |
| *G06Q 30/01* | (2023.01) |
| *G06Q 10/107* | (2023.01) |
| *G06Q 10/105* | (2023.01) |
| *G06N 3/08* | (2023.01) |

(Continued)

(52) U.S. Cl.
CPC .............. *G06Q 30/01* (2013.01); *G06N 3/08* (2013.01); *G06N 7/01* (2023.01); *G06Q 10/105* (2013.01); *G06Q 10/107* (2013.01); *G06Q 10/109* (2013.01)

(58) Field of Classification Search
None
See application file for complete search history.

(56) References Cited

U.S. PATENT DOCUMENTS

| 8,311,874 B2 | 11/2012 | Gupta et al. |
|---|---|---|
| 9,633,057 B2 | 4/2017 | Glidden |

(Continued)

OTHER PUBLICATIONS

Anonymous "Method and Apparatus to Perform Automated Data Migration Between Heterogeneous Data Sources" 2009.

(Continued)

*Primary Examiner* — Mandrita Brahmachari
(74) *Attorney, Agent, or Firm* — David J. Greer; Ridout & Maybee LLP

(57) ABSTRACT

A computer implemented method and system, comprising: retrieving, from an electronic data storage, participation data for each of a plurality of contacts that are associated with an opportunity, the participation data including information indicating types of communication activities the contacts have participated in in respect of the opportunity and times of the participation; comparing the participation data for the plurality of contacts with historic participation data for each of a plurality of decision maker contacts for a plurality of historic opportunities, the historic participation data including information indicating types of communication activities the decision maker contacts have participated in in respect of the historic opportunities and times of the participation; and computing, based on the comparing, which of the plurality of contacts associated with the opportunity is a potential decision maker and storing information indicating the identity of the potential decision maker.

9 Claims, 3 Drawing Sheets

(51) Int. Cl.
*G06Q 10/109* (2023.01)
*G06N 7/01* (2023.01)

(56) References Cited

U.S. PATENT DOCUMENTS

| | | | |
|---|---|---|---|
| 2002/0049626 A1 | 4/2002 | Mathias | |
| 2005/0065980 A1 | 3/2005 | Hyatt | |
| 2005/0125463 A1 | 6/2005 | Joshi et al. | |
| 2005/0131762 A1 | 6/2005 | Bharat et al. | |
| 2007/0129977 A1 | 6/2007 | Forney | |
| 2007/0130170 A1 | 6/2007 | Forney | |
| 2007/0130182 A1 | 6/2007 | Forney | |
| 2009/0276296 A1 | 11/2009 | Spriegel | |
| 2009/0299830 A1* | 12/2009 | West | G06Q 10/06 709/224 |
| 2009/0313075 A1 | 12/2009 | O'Sullivan et al. | |
| 2010/0005085 A1 | 1/2010 | Millmore | |
| 2010/0121684 A1 | 5/2010 | Morio et al. | |
| 2010/0332290 A1 | 12/2010 | Narvaez et al. | |
| 2011/0161835 A1 | 6/2011 | Karam | |
| 2011/0196716 A1 | 8/2011 | Srinivasan et al. | |
| 2011/0207484 A1 | 8/2011 | Holal et al. | |
| 2011/0270763 A1 | 11/2011 | Graham, III | |
| 2011/0276356 A1 | 11/2011 | Smith | |
| 2011/0289106 A1 | 11/2011 | Rankin, Jr et al. | |
| 2012/0095837 A1 | 4/2012 | Bharat | |
| 2012/0203584 A1 | 8/2012 | Mishor et al. | |
| 2012/0253924 A1 | 10/2012 | Giese et al. | |
| 2013/0054306 A1 | 2/2013 | Bhalla | |
| 2013/0124259 A1 | 5/2013 | Chourey et al. | |
| 2013/0166358 A1 | 6/2013 | Parmar | |
| 2013/0218883 A1 | 8/2013 | McConnell et al. | |
| 2014/0136613 A1 | 5/2014 | Chandar | |
| 2014/0143018 A1 | 5/2014 | Nies | |
| 2014/0173078 A1 | 6/2014 | McCord | |
| 2014/0214943 A1 | 7/2014 | Shapero et al. | |
| 2014/0278620 A1* | 9/2014 | Khan | G06Q 10/0631 705/14.42 |
| 2014/0358946 A1 | 12/2014 | Glidden et al. | |
| 2015/0006297 A1 | 1/2015 | Stark | |
| 2015/0026075 A1* | 1/2015 | Mondri | G06F 16/27 705/304 |
| 2015/0205842 A1 | 7/2015 | Jain et al. | |
| 2015/0248403 A1 | 9/2015 | PaZdziora et al. | |
| 2016/0034904 A1* | 2/2016 | Arroyo | G06Q 30/0201 705/7.29 |
| 2016/0232540 A1 | 8/2016 | Gao | |
| 2016/0247163 A1 | 8/2016 | Donsky | |
| 2016/0255082 A1 | 9/2016 | Rathod | |
| 2016/0284012 A1* | 9/2016 | Hom | G06Q 30/06 |
| 2016/0358065 A1 | 12/2016 | Gedge et al. | |
| 2017/0124595 A1 | 5/2017 | Costache | |
| 2017/0213178 A1 | 7/2017 | Todd | |
| 2017/0236081 A1 | 8/2017 | Smith | |
| 2017/0270099 A1 | 9/2017 | Gomy | |
| 2017/0329770 A1 | 11/2017 | Kozak | |
| 2017/0372254 A1 | 12/2017 | Vainas et al. | |
| 2018/0097836 A1* | 4/2018 | Stolarz | H04L 63/10 |
| 2018/0101771 A1 | 4/2018 | Schwarm et al. | |
| 2018/0246886 A1 | 8/2018 | Dragomirescu | |
| 2018/0293550 A1 | 10/2018 | Liang et al. | |
| 2019/0074987 A1 | 3/2019 | Wiener et al. | |
| 2019/0095507 A1 | 3/2019 | Elisseeff et al. | |
| 2019/0140995 A1 | 5/2019 | Roller et al. | |
| 2019/0251593 A1 | 8/2019 | Allouche | |
| 2019/0324655 A1 | 10/2019 | Nguyen et al. | |
| 2019/0361879 A1 | 11/2019 | Rogynskyy et al. | |
| 2020/0065768 A1 | 2/2020 | Fuller | |
| 2021/0042800 A1* | 2/2021 | Chandra | G06N 3/08 |

OTHER PUBLICATIONS

Eggert, A. et al. "Value creation in the relationship life cycle: A quasi-longitudinal analysis" Industrial Marketing Management. 35 2006.

Jap, S. et al. "Testing a Life-Cycle Theory of Cooperative Interorganizational Relationships: Movement Across Stages and Performance" Management Science. 53 2007.

Saberi, M. et al. "Next Generation of Interactive contact centre for efficient customer recognition: Conceptual Framework" Proceedings of the 2016 International Conference on Industrial Engineering and Operations Management Kuala Lumpur, Malaysia, 2016.

Martens et al. "A Data Decomposition Method for Stepwise Migration of Complex Legacy Data" 2018.

Aggour, K. et al. "Mining company networks for marketing insights and sales leads", in Proceedings of the 2013 IEEE/ACM International Conference on Advances in Social Networks Analysis and Mining (ASONAM '13) 2013.

\* cited by examiner ly disclosure invention relates to systems and
SYSTEM AND METHOD FOR IDENTIFICATION OF A DECISION-MAKER IN A SALES OPPORTUNITY

CROSS-REFERENCE TO RELATED APPLICATION

This application claims the benefit of and priority to the following application, the contents of which are incorporated herein by reference: U.S. Provisional Patent Application No. 62/898,423 entitled "SYSTEM AND METHOD FOR IDENTIFICATION OF A DECISION-MAKER IN A SALES OPPORTUNITY", filed Sep. 10, 2019.

TECHNICAL FIELD

The present disclosure invention relates to systems and methods for automated processing and analysis of data from Customer Relationship Management (CRM) systems.

BACKGROUND

Enterprises such as companies, accounting firms, law firms, universities, partnerships, agencies and governments commonly use CRM systems and related technology to manage relationships, interactions and opportunities with other parties such as customers and potential customers with clients.

CRM systems can track a lot of information. Numerous parties can be involved in communication streams that occur between the users of a selling entity and contacts of a purchasing account. One of the challenges for enterprise sales personnel today is determining, based on the available information, the right contact within a client account/organization to make a decision on a potential sales opportunity.

It can be difficult to assess who within a client company is the contact that will make the final decision on approving a potential opportunity. This is compounded because the title/position of the decision maker may vary by company to company with individuals having the same/similar title in different companies not always being the one to make the decision.

Information about the decision making process at a client company or potential client company is not always available to or efficiently shared with the enterprise sales personnel and may be unknown to the sales person attempting to get a potential opportunity approved.

The foregoing examples of the related art and limitations thereto are intended to be illustrative and not exclusive. Other limitations of the related art will become apparent to those of skill in the art upon a reading of the specification and a study of the drawing.

SUMMARY

According to a first example aspect, a computer implemented method is disclosed, comprising: retrieving, from an electronic data storage, participation data for each of a plurality of contacts that are associated with an opportunity, the participation data including information indicating types of communication activities the contacts have participated in in respect of the opportunity and times of the participation; comparing the participation data for the plurality of contacts with historic participation data for each of a plurality of decision maker contacts for a plurality of historic opportunities, the historic participation data including information indicating types of communication activities the decision maker contacts have participated in in respect of the historic opportunities and times of the participation; and computing, based on the comparing, which of the plurality of contacts associated with the opportunity is a potential decision maker and storing information indicating the identity of the potential decision maker.

According to one or more examples of the preceding aspects, the types of communications activities include one or more of: email messages; in-person and/or virtual meetings; and telephone calls.

According to one or more examples of the preceding aspects, the participation data for each of the plurality of contacts and the historic participation data for each of the plurality of decision maker contacts includes information that indicates position titles of the contacts and the decision maker contacts, respectively.

According to one or more examples of the preceding aspects, the participation data for each of the plurality of contacts and the historic participation data for each of the plurality of decision maker contacts includes information that indicates position titles of the contacts and the decision maker contacts, respectively.

According to one or more examples of the preceding aspects, the participation data for each of the plurality of contacts and the historic participation data for each of the plurality of decision maker contacts includes information that indicates IDs of the contacts and the decision maker contacts, respectively.

According to one or more examples of the preceding aspects, comparing the participation data with the historic participation data comprises: computing, for each of the plurality of the contacts associated with the opportunity, a similarity of the participation data for the contact with the historic participation data for each of the decision maker contacts; and ranking the contacts as potential decision makers based on the computed similarities.

According to one or more examples of the preceding aspects, computing the similarity of the participation data for the contact with the historic participation data for each of the decision maker contacts is based on a similarity of the ID of the contact and the decision maker contact, a similarity of the position title of the contact and the decision maker contact, and a similarity of communication activities that the contact and the decision maker contact each participated in at stages within the opportunity and the historic opportunity, respectively.

According to one or more examples of the preceding aspects, computing, based on the comparing, which of the plurality of contacts associated with the opportunity is a potential decision maker comprising selecting a set of the contacts having the highest rankings as potential decision makers, the method further comprising, prior to storing information indicating the identity of the potential decision maker, presenting the set of contacts through a user interface and receiving user input indicating at least one of the group as the potential decision maker, wherein storing information indicating the identity of the potential decision maker comprises storing the information in the electronic database as part of a record for the opportunity.

According to one or more examples of the preceding aspects, comparing the participation data for the plurality of contacts with the historic participation data comprises inputting the participation data for each of the plurality of contacts to a neural network model that has been trained based on the historic participation data for each of the plurality of decision maker contacts, the neural network model being configured to output a respective probability value for each of the plurality of contacts indicating a predicted likelihood that the contact is the potential decision maker contact.

According to one or more examples of the preceding aspects, the opportunity is an open opportunity and the method is performed during a duration of the open opportunity.

According to a further example aspect, a computer system is disclosed that comprises a processor, and a non-volatile storage coupled to the processor and including software instructions that, when executed by the processor, configure the computer system to perform the methods of any of the preceding aspects.

According to a further example aspect, is a computer readable medium storing software instructions that, when executed by a processor, configure the processor to perform the methods of any of the preceding aspects.

BRIEF DESCRIPTION OF DRAWINGS

Exemplary embodiments are illustrated in the referenced figures of the drawings. It is intended that the embodiments and figures disclosed herein are to be considered illustrative rather than restrictive.

DESCRIPTION

Figure 1:
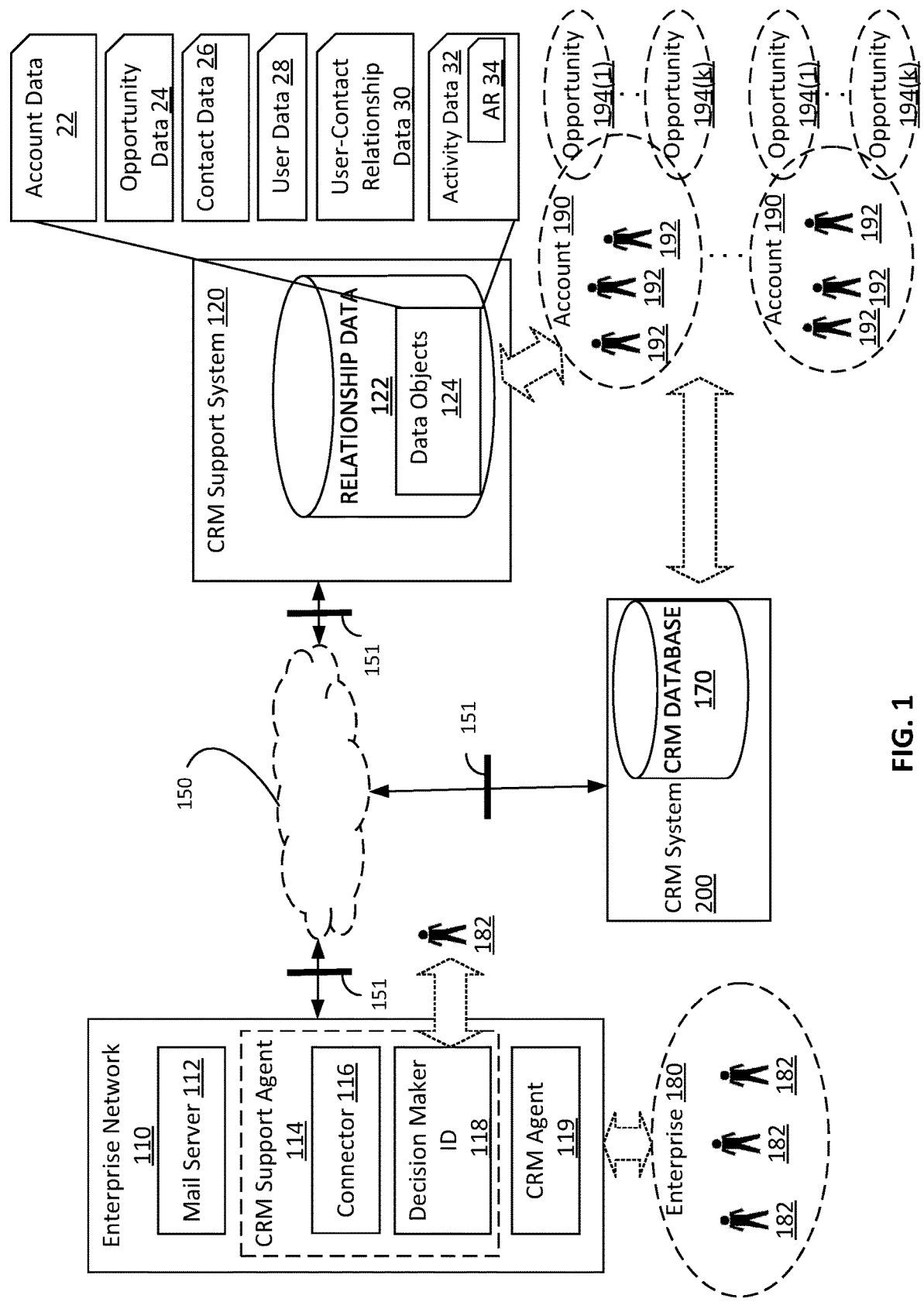
FIG. 1 is a simplified block diagram illustrating an environment that includes an enterprise network, a CRM system, and a CRM support system in accordance with an example embodiment of the present disclosure.

The following embodiments and aspects thereof are described and illustrated in conjunction with systems, tools and methods which are meant to be exemplary and illustrative, not limiting in scope. In various embodiments, the above-described problem has been reduced or eliminated, while other embodiments are directed to other improvements.

The embodiments will now be described more fully hereinafter with reference to the accompanying drawings, in which some, but not all, embodiments of the invention are shown. The features and aspects presented in this disclosure may be embodied in many different forms and should not be construed as limited to the embodiments set forth herein. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Example embodiments are directed to systems and methods for improved processing of data to enable identification of an individual contact at an account (e.g., a client or customer company) who ultimately makes the decision to approve the successful completion of a new opportunity. In some example embodiments, a decision maker identification system functions with a combination of data from a CRM system (e.g., account and opportunity data) and a further relationship database of account information and relationship measurements. In some example embodiments, the decision maker identification system will retrieve all successful sales opportunities for a selected account that is available from the CRM system and the associated relationship and communication data from the relationship database. In example embodiments, the decision maker identification system will determine all individuals that were involved in the opportunity, when they were involved, and determine which individual was the decision-maker.

The system and methods of example embodiments may, in some applications, provide results that are account-specific in that a specific individual within the account organization is identified as most likely to be the decision maker. In at least some examples, identification of a decision maker is based on not just generic titles of people that typically make such decisions, but also based on patterns of involvement of people in the opportunity process.

The system and methods of example embodiments may, in some applications, generate information and select a decision maker based on past experiences with that specific account, including successful opportunities with that account.

In at least some example embodiments, the automated systems disclosed herein may reduce the amount of interaction required between a computer system (e.g. with a CRM system) and an individual than might otherwise be required to discover the same, or less accurate information, using traditional CRM based approaches. This may in turn reduce the computational resources and/or use (and thus wear-and-tear and depreciation) of user-computer interfaces and/or user resources that could otherwise be required in the absence of the presently disclosed solutions.

Throughout the following description, specific details are set forth in order to provide a more thorough understanding to persons skilled in the art. However, well known elements may not have been shown or described in detail to avoid unnecessarily obscuring the disclosure. Accordingly the description and drawings are to be regarded in an illustrative, rather than a restrictive, sense.

FIG. 1 illustrates an example environment in which the methods and systems described in this disclosure may be implemented. In the example of FIG. 1, the environment includes an enterprise network 110 that supports an enterprise such as a company, firm or other type of organization (referred to in this disclosure as "enterprise 180"). In example embodiments, a plurality of individuals are registered or otherwise associated with the enterprise network 110 as users 182 of the enterprise network 110. These individual users 182 may for example be employees, owners, partners, consultants, volunteers, and interns of the enterprise 180. In some examples, enterprise 180 could have as few as one user 182, and in some examples, enterprise 180 may have thousands or more users 182.

At any given time the enterprise 180 has, or is, pursuing commercial relationships with one or more external entities, referred to in this disclosure as "accounts" 190. For example, such external entities could be existing or potential customers, clients, donors, or other entities of interest to the enterprise, and may include, among other things, companies, partnerships, universities, firms, government entities, joint venture groups, non-government organizations, charities and other types of groups. Typically, each account 190 will have an associated set of individual contacts, referred to in this disclosure as "contacts" 192. For example, the individual contacts 192 associated with an account 190 may be employees, owners, partners, consultants, volunteers, and interns of the account 190. Furthermore, at any given time the enterprise 180 will typically have completed or will be pursuing one or more opportunities 194(1) to 194(k) (with k being account dependent and representing a total number of open and closed opportunities with a specific account). In this disclosure, the reference "opportunity 194(j)" will be used to refer a generic individual opportunity, and "opportunities 194" used to refer to a generic group of opportunities. An opportunity 194(j) may for example be a sales opportunity to sell a product or service, and may have an opportunity lifetime (e.g., duration of time from recognition of existence of the opportunity to closing of the opportunity) that can be divided into a set of successive stages or steps such as the seven basic stages of a sales cycle (e.g., Prospecting, Preparation, Approach, Presentation, Handling objections, Closing).

Enterprise network 110 may, for example, include a plurality of computer devices, servers and systems that are associated with the enterprise 180 and are linked to each other through one or more internal or external communication networks, at least some of which may implement one or more virtual private networks (VPN).

In example embodiments, the environment of FIG. 1 also includes a CRM support system 120, and a CRM system 200, each of which may also include one or more computer devices, servers and systems. One or both of CRM support system 120 and CRM system 200 may, in some examples, be operated by third party organizations that are service providers to the enterprise 180 associated with enterprise network 110. CRM support system 120 and a CRM system 200 are configured to track customer data on behalf of enterprise 180.

In the illustrated example, enterprise network 110, CRM support system 120, and CRM system 200 are each connected to a common communication network 150. Communication network 150 may for example include the Intranet, one or more enterprise intranets, wireless wide area networks, wireless local area networks, wired networks and/or other digital data exchange networks. Respective firewalls 151 may be located between the communication network 150 and each of the enterprise network 110, CRM support system 120, and CRM system 200. In different example embodiments, one or more of the features or functions of CRM support system 120 and CRM system 200 that are described herein could alternatively be implemented in a common system or implemented within the enterprise network 110. Alternatively, one or more of the features or functions of the CRM agent 114 (for example decision maker identification module 118) could be implemented in CRM support system 120 or CRM system 200.

Enterprise network 110 includes at least one mail server 112 for handling and delivering external email that enterprise network 110 exchanges with remote mail servers through communication network 150. Thus, mail server 112 contains emails sent/received by the enterprise associated with enterprise network 110. In some examples, mail server 112 may also handle internal emails that are internal within enterprise network 110.

In example embodiments, enterprise network 110 includes a CRM agent 119 that provides the enterprise network 110 with an interface to CRM system 200.

In example embodiments, enterprise network 110 also includes a CRM support agent 114 that provides the enterprise network 110 with an interface to CRM support system 120. In example embodiments, CRM support agent 114 includes a connector 116 and a decision maker identification module 118. As described in greater detail below, connector 116 is configured to interact with systems within the enterprise network 110 (such as mail server 112) to extract information about activities (such as communication activities) and provide that information to CRM support system 120. As will also be described in greater detail below, decision maker identification module 118 is configured to interact with CRM system 200 and CRM support system 120 to provide, among other things, intelligent information about which contact would most likely be the decision maker for a given opportunity.

In example embodiments, CRM system 200 may be implemented using a known CRM solution such as, but not limited to, Salesforce.com™, Microsoft Dynamics™, InterAction™ or Maximizer™, and includes a CRM database 170 that includes customer data (e.g., CRM data) for accounts 190 is desirous of tracking. The CRM data that is stored in a CRM database 170 for an account 190 may for example include: (I) general account data, (II) opportunity data about specific opportunities that the enterprise has undertaken in the past, is currently undertaking, or is proposing to undertake in the future with the account 190, and (III) individual contact data that includes contact information for individual contacts who are members of the account 190.

In example embodiments, CRM support system 120 is configured to provide enhanced CRM information and functionality that supplements CRM System 200. CRM support system 120 includes a relationship data storage 122 for storing relationship data generated in respect of the accounts 190 of interest to enterprise 180. In example embodiments, similar to CRM database 170, relationship data storage 122 may store, in respect of each account 190, relationship data objects 124 that include: (I) account data 22 that provide general information about the account 190, (II) opportunity data 24 about specific opportunities that the enterprise has undertaken in the past, is currently undertaking, or is proposing to undertake in the future with the account 190, (III) individual contact data 26 that includes contact information for individual contacts 192 (e.g., employees) who are associated with the account 190, (IV) user data 28, that includes information about enterprise users 182 who are involved in the relationship with an account 190, (V) user-contact relationship strength data 30, and (VI) activity data 32 that includes information about activities between enterprise 180 and account 190. The data in relationship data storage 122 may include some or all of the information stored at CRM database 170, as well as supplemental information.

In example embodiments, the CRM Support System 120 interfaces with the connector 116 of CRM support agent 114 and other possible data sources to collect and update data objects 124 stored in relationship data storage 122. In some examples, the CRM support system 120 is configured to periodically refresh (e.g., for example on a timed cycle such as once every 24 hours) the content of data objects 124 such that the data maintained in relationship data storage 122 always includes current or near-current information. The CRM Support System 120 may periodically refresh the information stored in relationship data storage 122 based on information from a plurality of sources. For example, CRM support system 120 may obtain data from the CRM database 170 of CRM system 200, from enterprise network 110, as well as from other data sources (e.g., third party data provider services) that are available through communication network 150. In some examples, CRM support system 120 may obtain at least some of the data identified in the following tables from the CRM database 170 through network 150, and in some cases indirectly from CRM database 170 through CRM agent 119 of enterprise network 110.

In example embodiments, the basic data included in account data 22 stored at relationship data storage 122 may include, for each account 190, some or all of the fields listed in the following Table 1, among other things:

TABLE 1

Account Data Fields:

| Field | Field Description |
|---|---|
| Enterprise ID | Unique identifier assigned to Enterprise 180 |
| Account ID | Unique identifier assigned to Account 190 |
| Account Industry Code | Code that identifies primary industry type of customer organization (e.g., Standard Industrial Classification (SIC) Code and/or North American Industry Classification System (NAICS) Codes) |
| Number of Employees | Number of Employees of Account Organization |
| Account Size Score | Score assigned based on size of account organization (e.g., organization size of 1500 += 10 points; 1000 to 1500 = 9 points; 750-1000 = 8 points, etc.). |
| Account Annual Revenue | Annual Revenue of account organization for one or more previous years |
| Owner User ID | User ID of enterprise user 182 who owns the account (e.g., user 182 who has primary responsibility for enterprise-account relationship) |
| Name | Name of Account (e.g., company name) |
| Top User-Account Relationship | The enterprise user 182 that has the strongest relationship with the account 190 |
| Account Active Indicator | Indicates that Account is currently active |

In example embodiments, the basic data included in opportunity data 24 stored at relationship data storage 122 may include, for each opportunity with account 190, opportunity records that include some or all of the fields listed in the following Table:

TABLE 2

Opportunity Data Fields:

| Field | Field Description |
|---|---|
| Opportunity ID | Unique identifier assigned to Opportunity |
| Account ID | Account ID of the account that is the target of the opportunity |
| Created Date | Date opportunity registered with CRM support system |
| Closed Indicator | Indicates if opportunity is closed |
| Closed Date | Date Opportunity was closed |
| Account Decision Maker* | Contact ID of account contact identified as Decision Maker |
| Won Indicator | Indicates opportunity closed successfully (e.g., with a sale) |
| Stage Indicator (Start Date, End Date)* | Indicates stage that opportunity is at. Can also include subfields for stage start and end dates (e.g., stages can be selected from the seven basic stages of the sales cycle) |

TABLE 2-continued

Opportunity Data Fields:

| Field | Field Description |
|---|---|
| Opportunity Type | Indicates type of opportunity (e.g., sale, lease, license) |
| Deal Quantity | Number of units expected to be sold/licensed |
| Deal Size Score | Score assigned based on estimated revenue (e.g., projected sales over duration of successfully closed opportunity: $1-$20,000 = 1 point; $20,001-$50,000 = 2 points; $50,001-$100,000 = 3 points; etc.) |
| Opportunity Duration | Expected lifetime of successfully closed opportunity (e.g., length of contract) |
| Geographic Indicator | Primary region of opportunity (e.g., NA, EMA, APAC, LATAM, SA) |
| Probability Indicator | Indicates a predicted likelihood of a successful close |
| Lead Source | Source of lead that generated opportunity (e.g., trade show inquiry; referral, etc.) |
| Main Contact ID | Contact ID of lead contact for opportunity with the account |
| Main User ID | Contact ID of lead user for opportunity |
| Last Activity Date | Date of most recent activity recorded in respect of opportunity |

*Indicates fields that will be repeated as required

In at least some example embodiments, the opportunity data 24 includes an "Account Decision Maker" field that is populated with the contact id of at least one individual contact that was identified as being a prime decision maker for the past opportunity. In at least some examples, such information is obtained from or confirmed by a user 182 as part of an opportunity closing survey that is presented by CRM support agent 114, CRM support system 120, or CRM system 200 to an authorized user 182 when an opportunity closes. Other information fields such as the "won indicator" may also be obtained as part of a closing survey.

In example embodiments, the basic data included in contact data 26 stored at relationship data storage 122 may include, for each contact 192 at account 190, contact records that include some or all of the fields listed in the following Table 3, among other things:

TABLE 3

Contact Data Fields:

| Field | Field Description |
|---|---|
| Contact ID | Unique contact identifier |
| Date Created | Date contact added |
| Account ID | Account ID of the account the contact is associated with |
| Department | Name of contact's department in the account organization |
| Title | Title/position of contact within account organization |
| Title Score | Score assigned to Contact based on contact's position at the account organization |
| Contact -Enterprise Relationship Score | Score That Indicates Perceived Value of the Relationship with the Contact |
| First Name | Contact's First Name |
| Last Name | Contact's Last Name |
| Full Name | Contact's Full Name |
| Primary Email | Contact's Primary Email |
| Primary Phone | Contact's Primary Phone |

TABLE 3-continued

Contact Data Fields:

| Field | Field Description |
|---|---|
| Opportunity ID (*) | Opportunity ID for opportunity for which contact is member of the Account Team (e.g., purchasing team) |

(*) Indicates fields that will be repeated as required

In example embodiments, the basic data included in user data 28 stored at relationship data storage 122 may include, for each user 182 that has a relationship with a contact 192 at the account 190, user records that include some or all of the variable fields listed in the following Table 4, among other things:

TABLE 4

User Data Fields:

| Field | Field Description |
|---|---|
| User ID | Unique user identifier |
| Account ID | Account ID of the subject account |
| Department | Name of user's department in the enterprise organization |
| Title | Title/position of user within enterprise organization |
| User-Account Relationship Score | Score That Indicates Perceived Value of User's Relationship With Contact |
| Opportunity ID (*) | Opportunity ID for opportunity for which user is member of the enterprise team (e.g., selling team) |

(*) Indicates fields that will be repeated as required

In example embodiments, the basic data included in user-contact relationship data 30 stored at relationship data storage 122 may include, for each user-contact relationship that exists between a user 182 within enterprise 180 and a contact 192 within the account 190, user-contact relationship records that include some or all of the variable fields listed in the following Table 5, among other things:

TABLE 5

User-Contact Relationship Data Fields:

| Field | Field Description |
|---|---|
| User ID | Unique user identifier |
| Contact ID | Contact Unique Identifier |
| Start Date | Date when relationship between user and contact started |
| Active Indicator | Indicates if relationship is currently active |
| User-Contact Relationship Score | Score that indicates perceived strength of User-Contact Relationship Strength |
| Last Activity Date | Date of last recorded activity including user and contact |

In example embodiments, the activity data 32 stored at relationship data storage 122 may include data for activities related to the entity-account relationship. Activities may for example include communication activities and documentation activities among other things. Activity data 32 may include respective activity records 34 for each logged activity. Each activity record 34 may include, depending on the type of activity and availability of information, the variable fields listed in the following Table 6, among other things:

TABLE 6

Activity Record Data Fields:

| Field | Field Description |
|---|---|
| Activity ID | Unique identifier assigned to activity |
| Account ID | Identity of Account whose contacts participated in the activity |
| Opportunity ID | Identity of the opportunity that activity related to |
| Activity Type Indicator | Value that identifies the type of activity (e.g., (i) communication activity: incoming email, outgoing email, incoming meeting request, outgoing meeting request, incoming phone call, outgoing phone call, in-person meeting, virtual meeting, (ii) documentation activity: proposal submitted, draft statement of work (SOW) submitted; final SOW submitted; contract submitted for review). |
| Document ID | ID of document template (can be used to identify content of standard form email in the form of a communication action, or to identify document template in case of documentation activity) |
| Start Time | Date and time stamp indicating start of activity |
| Activity Duration | Duration of activity (e.g., length of meeting or phone call) |
| Sentiment Indicator | Indicator provided manually or by natural language processing algorithm as to sentiment of activity (e.g.: negative to positive sentiment on scale of 1 to 5, in example embodiments, may be determined at CRM support agent 114 and sent by connector 116 to relationship data storage 122) |
| Content Count* | Counts number of occurrences of predefined words in communication activity (e.g., product name, competitor product name). (In example embodiments, may be determined at CRM support agent 114 and sent by connector 116 to relationship data storage 122) |
| Participants - Account* | Contact IDs or other available identifier for all parties involved on account side of activity |
| Participants - Enterprise* | User IDs or other available identifier for all parties involved on enterprise side of activity |
| Participants - Pixel Tracked* | Contact IDs or other available identifier for all parties tracked though email pixel tracking on account side of activity, and time/place of viewing |

*Indicates fields that will be repeated as required

Regarding activity data 32, in example embodiments, CRM support agent 114 is configured to automatically collect information about communication activities between users 182 associated with the enterprise 180 and external contacts 192 associated with an account 190. These communication activities may for example be electronic communications such as email, meetings that are tracked in calendar systems and/or scheduled through email communications, and telephone calls that occur through a system that enables call logging. Each of these interactions have associated electronic data that includes a contact identifier (e.g., email address or phone number for contact 192), time stamp information for the interaction, and a user identifier (e.g., data that identifies the member(s) 182 of the enterprise 180 that were involved in the interaction.

In example embodiments, CRM support agent 114 is configured to collect the information about communication activities by interacting with devices and systems that are integrated with enterprise network 110 and generate reports that are sent to CRM support system 120 automatically on a scheduled basis or when a predetermined threshold is met or a predetermined activity occurs. In some examples, CRM support agent 114 may collect information from an enterprise mail server located within enterprise network 110 and or from calendar applications associated with enterprise network and users 182, via the connector 116.

In example embodiments, connecter 116 is configured to collect the information about communication activities by interacting with devices and systems that are integrated with enterprise network 110 and generate reports that are sent to CRM support system 120 automatically on a scheduled basis or when a predetermined threshold is met or a predetermined activity occurs. In some examples, connector 116 may collect information from the mail server 112. For example, in some embodiments connector 116 is configured to intermittently run a batch process to retrieve email messages from the mail server 112 so that communication activity data can be derived from the email messages and provided through communication network 150 to the relationship database 122.

In some examples, the connector 116 is configured to extract selected information from email messages as contact interaction data. For each email message, the extracted information may for example include any external email addresses included in the sender, recipient and carbon copy (CC) and blind carbon copy (BCC) recipient email address fields, along with a send or receive timestamp applied to the email message by the mail server 112. In example embodiments, the extracted information can also include information that identifies any enterprise users 182 that are participating in the email as sender or recipient or CC recipient. In example embodiments, the extracted information can also include information that identifies any account members 192 that are participating in the email as sender or recipient or CC recipient.

In example embodiments, meeting requests and invites will be included among the email messages that are processed by mail server 112, and connector 116 is configured to include email addresses in the meeting invitee list and organizer fields in the contact interaction data extracted from the emailed meeting invite. In some examples, connector 116 may also be configured to communicate directly with calendar applications of users 182 within the enterprise network 110 to identify email addresses belonging to possible external contacts and include that information in communication activity data. In some examples where enterprise network 110 supports phone call logging, for example in Voice-Over-Internet-Protocol (VOIP) implementations, connector 116 may be further configured to interact with a VOIP server to collect information about external phone numbers used for outgoing and internal calls for inclusion in communication activity data.

In some examples tracking pixel images may be embedded in emails and any resulting information about when the subject email is read (e.g., when, where and by whom) can be tracked as part of the communication activity information that is tracked and stored as activity data 32. In at least some examples the pixel tracking information may be mapped to a specific contact ID. Such information can provide an indication as to who viewed an email and when it was viewed.

It will be noted that a number of the data objects 124 include relationship scoring information, including: account data 22 includes a "Top User-Account Relationship" that identifies the enterprise user 182 that has the strongest relationship with the subject account 190; contact data 26 includes a "Contact-Enterprise Relationship Score" that indicates a total perceived value of the enterprise's 180 relationship with the subject contact 192; user data 28 includes a "User-Account Relationship Score" that indicates perceived value of user's relationship with contact; and user-contact relationship data includes a "User-Contact Relationship Score" that indicates perceived strength of the user-contact relationship. According to example embodiments, the CRM support system 120 is configured with a set of relationship strength prediction models for computing each of the respective relationship scores. In at least some examples, these scores are calculated by CRM support system 120 based on communication activities between enterprise users 182 and account contacts 192, such as the communications activities that are tracked as part of activity data 32. By way of example, the user-contact relationship score for an enterprise user 182—account contact 192 could be based on features such as, among other things: activity type (e.g., incoming email, outgoing email, incoming meeting request, outgoing meeting request, incoming phone call, outgoing phone call, in-person meeting, on-line meeting, video conference); frequency (e.g., number of communication activities with a defined time period); recentness of communication activities; and length of communication activity, among other things. For example, a user-contact relationship score could be quantified as a percentage (e.g., 0 to 100%) by applying a predetermined function, which may in some examples be a deterministic linear rules-based model, and in other examples may be a trained non-linear predictive model. In example embodiments, a deterministic model may be derived by a data scientist based analysis of simulated data and real data using one or more statistical analysis methods. In some example embodiments, User-Contact Relationship Score could be represented as a discrete ranking such as "3=high", "2=medium,"1=low".

In some examples a user-contact relationship score could be a composite of the contacts title score and a communication value based on the above attributes. In some examples, "Contact-Enterprise Relationship Score" could be based on a combination (e.g., sum or product) of all of the individual user-contact relationship scores that a contact 192 has with users 182 of enterprise 180. In some examples, a "User-Account Relationship Score" could be based on a combination (e.g., sum or product) of all of the individual user-contact relationship scores that a user 182 has with account contacts 192; In some examples, the "Contact-Enterprise Relationship Score" could be based on a combination of all the individual user-contact relationship scores across all user-contact relationships between an enterprise 180 and an account 190.

In example embodiments, as indicated in FIG. 1, the decision maker identification module 118 of the CRM support agent 114, retrieves contact and opportunity information from the CRM system 200, and contact and account activity data from the relationship database 122. In some examples, the CRM support agent 114 may retrieve opportunity information from the relationship database 124, which may have obtained at least some of the opportunity information from the CRM system 200.

In example embodiments, the decision maker identification module 118 will analyze previously completed sales opportunities (192(1) through 194(k)), reviewing the activity data 32 and identify the contact most likely to have been the decision maker in the opportunity.

Figure 2:
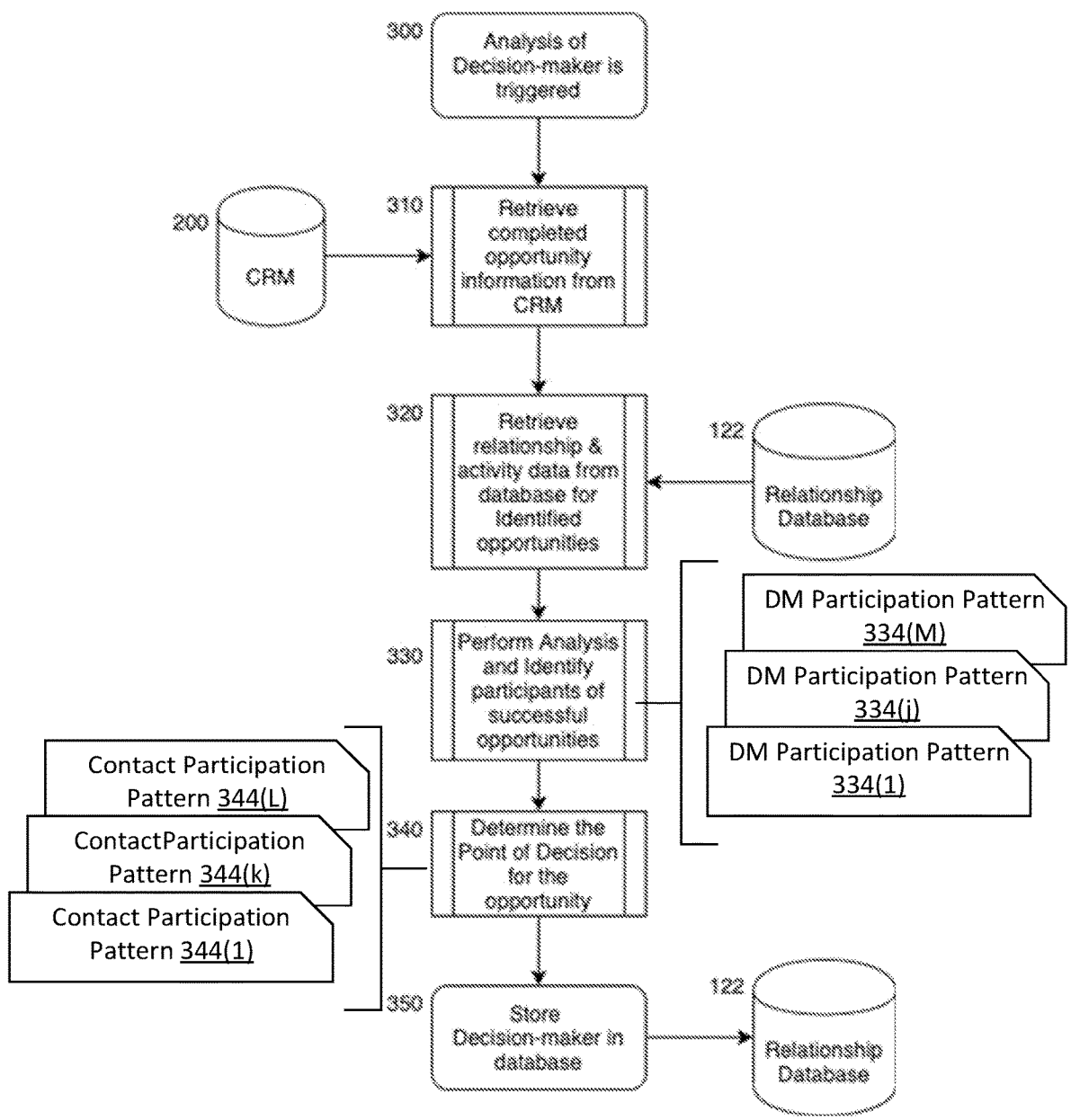
FIG. 2 is a flow diagram illustrating steps taken by a decision maker identification module of a CRM support agent in accordance with an example embodiment of the present disclosure.

FIG. 2 is a flow diagram illustrating steps taken by the decision maker identification module 118 of a CRM support agent 114 in accordance with an example embodiment of the present disclosure. In example embodiments, steps 300 to 330 are primarily directed to extracting information about closed activities to determine patterns or rules that can be used to identify a decision maker for a current or future opportunity.

Step 300—In some examples, the decision maker identification module 118 is activated when there is a desire to determine the contact that is most likely the ultimate decision maker for a specific account 190 for an opportunity 194(j). This activation may be triggered by a plurality of different activities such as, but not limited to, manual activation by a data steward, an opportunity has successfully closed (e.g., to update stored patterns), an opportunity is opened with an account, an opportunity has progressed from one sales stage to the next sales stage, a regularly scheduled occurrence (batch job), or an initial installation of the System.

Step 310—The decision maker identification module 118 is configured to retrieve information about selected closed opportunities 194 that will be used as a basis for selecting a decision maker in respect of a current opportunity. In some examples, the selected opportunities will be limited to opportunities that meet one or more of the following criteria, which may in some examples be user defined: (1) successfully closed opportunities with the account 190 that the current opportunity is with; (2) successfully closed opportunities, that closed within a specified timeframe (e.g., last 18 months) with the account 190 that the current opportunity; (3) successfully closed opportunities that fall within the same industry sector of the current opportunity; (4) successfully closed opportunities, that closed within a specified timeframe (e.g., last 18 months), that fall within the same industry sector of the current opportunity; (5) successfully closed opportunities by the enterprise 180; (7) successfully closed opportunities by the enterprise 180 that closed within a specified timeframe (e.g., last 18 months); (8) successfully closed opportunities with the account 190 that included at least some overlap with the contacts 192 that are involved in the current opportunity; (9) successfully closed opportunities with the account 190 that included at least some overlap with the contacts 192 that are involved in the current opportunity and that closed within a specified timeframe (e.g., last 18 months); (10) successfully closed opportunities that fall into one or more of the above specified categories and that have not been previously used to determine a decision making contact. In at least some examples, unsuccessful opportunities may also be selected for analysis. The above criteria are only examples and it will be noted from the above tables that opportunities can be filtered and selected for analysis in step 310 on a number of different criteria based on any of the suitable opportunity related data fields identified in the above tables.

The information about opportunities may be obtained by the decision maker identification module 118 from opportunity data that is stored at CRM database 170, opportunity data 24 that is stored at relationship data storage 122, or a combination thereof.

Step 320—Further information related to the opportunities selected in step 310 may be retrieved by the decision maker identification module 118 from object data 124 from the relationship database 122, such as but not limited to: relationship score, health of account, importance score, type of contact, type of industry, frequency of communication by type (email, phone, meeting) and title/level of the contacts involved during the different phases of the sales opportunity (determined from the activity records 34 for the opportunities identified in step 310). As noted above, in at least some example embodiments, the opportunity data 24 includes an "Account Decision Maker" field that is populated with the contact id of at least one individual contact that was identified as being a prime decision maker for the past opportunity. Conversely, if a contact was involved in an opportunity and not identified as a decision maker, that contact can be auto labelled as "not a decision maker".

Step 330—The decision maker identification module 118 analyses the information retrieved in step 320 for successful opportunities. The decision maker identification module 118 will determine the involved contacts based on email chains, meeting attendees, telephone calls and the titles of the contacts involved. The decision maker identification module 118 will identify those contacts that were active near the point in time that the opportunity was approved. The decision maker identification module 118 will compare the contacts that were added near the point in time that the opportunity was approved with those that were involved in activity records 34 early in the opportunity.

By way of example, in an illustrative example embodiment, in step 330 decision maker identification module 118 is configured to generate, based on data retrieved in steps 310 and 320, a respective decision maker (DM) participation pattern 334(j) for each of the opportunities 194 selected in step 310 based on data retrieved in steps 310 and 320.

In one example embodiment, the successful closed opportunities each have a populated "Decision maker ID" field included in opportunity data 24. The DM participation pattern 334(j) generated for an opportunity includes a set of features that identify a participation pattern for each contact that is identified as being a decision maker for the specific opportunity 194(j). For example, the DM participation pattern could identify the phases of the opportunity (e.g., when was DM contact involved) that the DM contact was involved in and the types of activities the DM contact was involved in (e.g., what did the DM contact do when involved). In this regard, the following table 7 illustrates an example of the information that may be included as features in a DM participation pattern 224(j). In the following table, Y indicates that the DM contact (e.g., Joanne Smith) participated in a particular communication activity during a particular stage of the opportunity (e.g., one of consecutive sales cycle stages 1 to 7), and "N" indicates no participation by the DM contact for the activity during the respective stage:

TABLE 7

DM Participation Pattern 334(j) for a Decision Maker:
Account ID: 4321
Opportunity ID: 1234
Decision Maker: Joanne Smith
(Contact ID: 23451)
Title: Executive VP (Title Score: 8)
Industry Code: 5676

| Activity | Stage 1 (e.g. Prospecting) | Stage 2 (e.g. Prep) | ( . . . ) | Stage 6 (e.g. Objections) | Stage 7 (e.g. Closing) |
|---|---|---|---|---|---|
| Incoming Email (CC) | Y | N | | N | N |
| Incoming Email (From) | Y | N | | Y | Y |

TABLE 7-continued

DM Participation Pattern 334(j) for a Decision Maker:
Account ID: 4321
Opportunity ID: 1234
Decision Maker: Joanne Smith
(Contact ID: 23451)
Title: Executive VP (Title Score: 8)
Industry Code: 5676

| Activity | Stage 1 (e.g. Prospecting) | Stage 2 (e.g. Prep) | ( . . . ) | Stage 6 (e.g. Objections) | Stage 7 (e.g. Closing) |
|---|---|---|---|---|---|
| Outgoing Email (CC) | Y | N | | N | N |
| Outgoing Email (TO) | Y | N | | Y | Y |
| Outgoing email (Pixel tracked) | Y | N | | N | Y |
| Virtual Meeting | Y | N | | Y | Y |
| In-person meeting | N | N | | N | N |
| In-coming Phone call | N | N | | N | Y |
| Outgoing phone call | Y | N | | N | N |

Step 340—In example embodiments, the decision maker identification module 118 will, based on the stage of a current opportunity, utilize the DM participation patterns 334(1) to 334(M) generated in respect of successful patterns to identify (e.g., compute) the possible decision makers in a current open opportunity. In one example embodiment, the decision maker identification module 118 performs this action by generating a corresponding current opportunity contact participation record 344(1) to 344(L) for each contact 192(1) to 192(L) that is identified in the Data Objects 124 as participating in the current open opportunity 194. In some examples, the features included in each contact participation records 344(1) to 344(L) is respectively compared against the features in each of the DM participation record 334(1) to 344(M) to generate LxM similarity rankings (e.g., a ranking for each pairing of: (i) contact for the current opportunity and (ii) selected historic opportunity). The contact with the highest similarity ranking with a selected historic opportunity can be identified as the probable decision makers. In some alternative examples, the rankings for each current opportunity contact across all of the closed opportunity DM participation patterns 334 can be summed or combined to come up with a total ranking for each of the current contacts, which is then used to determine probable DM contact from among the contacts in the current opportunity. In some examples, a k-nearest neighbor algorithm is used to identify and rank the respective patterns having the closest features. In some examples, certain features are weighted more than other features (e.g., same contact ID weighted higher than same industry) when determining the similarity rankings. In some examples multiple probable or potential decision makers (e.g., those having the highest rankings) may be identified and presented in a user interface to a user 182 for confirmation. In some examples, the relative weightings may be pre-determined based on statistical analysis performed in respect of historical opportunities.

Accordingly, in step 340, similarity rankings are based on one or more of: contact ID; title score and/or title; participation of contact in communication activities and the timing of such participation. For example, the patterns for successful opportunities may indicate that a person with a VP title historically has participated in stages 1 and 7 of an opportunity, but not in intervening stages. This may indicate that a person with a similar title who was involved earlier in the current opportunity but has not been involved in intermediate states is the decision maker and should be contacted again close to the closing stage.

Step 350—In some examples, the decision maker identification module 118 will store the identity of the contact that has been computed to be the decision maker in the relationship database 122. In some examples, the information may be presented through a user interface to a user 184 to confirm the potential decision maker selection. In example embodiments the decision maker identity is stored in the identification fields for the opportunity record for the current opportunity, thereby providing another data point for future DM participation patterns.

In some examples, the DM participation patterns 334 for past opportunities may be stored at relationship database 122 or enterprise network 110 such that steps 310 to 330 can be replaced with a retrieval step preceding step 340.

In some alternative example embodiments, DM identification module 118 may be configured with a neural network model that has been trained through supervised learning based on historic opportunity data (e.g. DM participation patterns 334) to predict a decision maker for a current opportunity based on some or all of the features identified in table 7. In such an embodiment, a feature set (such as a contact participation pattern that includes for example data such as shown in table 7) can be generated for each contact involved in a current opportunity and provided as input to a neural network model that will output a respective probability for each contact as being a decision maker. Accordingly, in such an embodiment a comparison of the current contact participation patterns with the historic opportunity participation patterns is effectively performed with the trained neural network model acting as an intermediary. Comparing the participation data for the plurality of contacts with the historic participation data comprises inputting the participation data for each of the plurality of contacts into the neural network model that has been trained based on the historic participation data for each of the plurality of decision maker contacts, the neural network model being configured to output a respective probability value for each of the plurality of contacts indicating a predicted likelihood that the contact is the potential decision maker contact.

In at least some examples, participation patterns that are generated in steps 310 to 330 for historic opportunities may also include information (e.g., participation patterns similar to patterns 334) for contacts that were involved in successful opportunities but were not identified as decision makers, thereby providing patterns that can be used to identify non-decision makers. The patterns for historic non-decision makers can also be used in step 340 using methods similar to those described above to identify contacts in a current opportunity who are not decision makers. In at least some examples, the determination of whether a particular contact is a decision maker can be determined based on similarities of their participation pattern to historic patterns for both decision makers and past non-decision makers.

Figure 3:
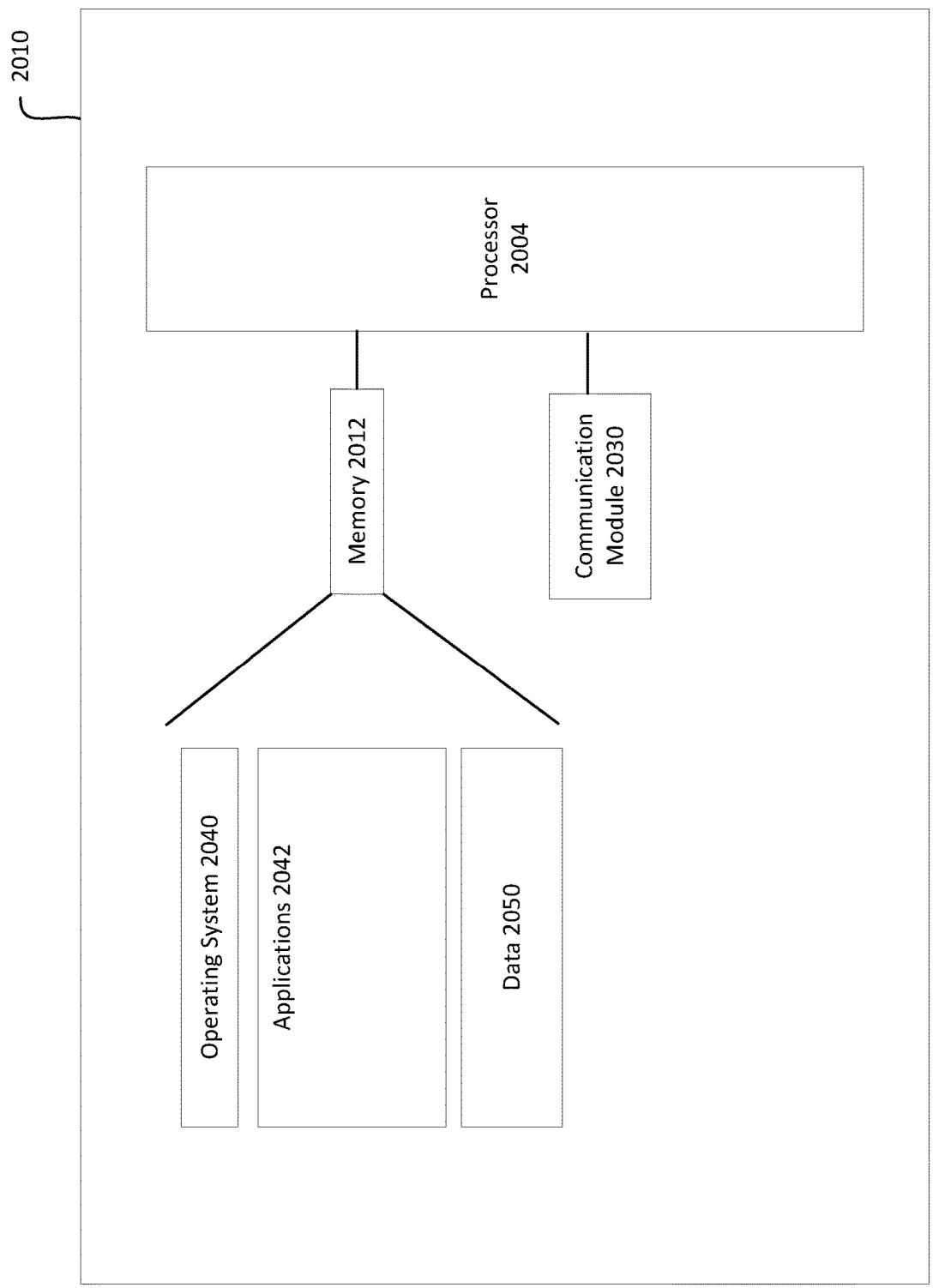
FIG. 3 is a simplified block diagram illustrating an example computer system for implementing one or more of the systems, modules and components shown in the environment of FIG. 1.

Referring to FIG. 3, an example embodiment of a computer system 2010 for implementing one or more of the modules, systems and agents included in enterprise network 110, CRM system 200 and CRM support system 120 will be described. In example embodiments, computer system 2010 may be a computer server. The system 2010 comprises at least one processor 2004 which controls the overall operation of the system 2010. The processor 2004 is coupled to a plurality of components via a communication bus (not shown) which provides a communication path between the components and the processor 2004. The system comprises memories 2012 that can include Random Access Memory (RAM), Read Only Memory (ROM), a persistent (non-volatile) memory which may one or more of a magnetic hard drive, flash erasable programmable read only memory (EPROM) ("flash memory") or other suitable form of memory. The system 2010 includes a communication module 2030.

The communication module 2030 may comprise any combination of a long-range wireless communication module, a short-range wireless communication module, or a wired communication module (e.g., Ethernet or the like) to facilitate communication through communication network 150.

Operating system software 2040 executed by the processor 2004 may be stored in the persistent memory of memories 2012. A number of applications 2042 executed by the processor 2004 are also stored in the persistent memory. The applications 2042 can include software instructions for implementing the systems, methods, agents and modules described above.

The system 2010 is configured to store data that may include data objects 124 and customer data, in the case of CRM support system 120.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer implemented method comprising:
generating decision maker patterns for a plurality of historic opportunities, wherein (i) each historic opportunity corresponds to a sales opportunity for a product or service between a first enterprise and a respective external entity; (ii) each historic opportunity has a respective opportunity timeline that is defined by a series of opportunity timeline stages between a respective start date for the historic opportunity and a respective closing date for the historic opportunity;
wherein generating the decision maker patterns comprises:
retrieving, from an electronic database, historic participation data for the plurality of historic opportunities, the historic participation data comprising, for each historic opportunity: (i) IDs of individual users from the first entity that have been identified as associated with the historic opportunity; (ii) IDs of individual contacts from the respective external entity that have been identified as associated with the historic opportunity; (iii) ID of a person from the respective external entity that has been identified as a respective decision maker for the historic opportunity; (iv) opportunity timeline data associating time periods of the historic opportunity with respective opportunity timeline stages; and (v) electronic communication activity data for electronic communications exchanged between the first enterprise and the respective external entity corresponding to the historic opportunity, including: (a) IDs of participants included in address fields of the electronic communications; (b) timestamp data for the electronic communications; and (c) tracking pixel image data indicating when at least some of the electronic communications have been viewed; and
generating a respective decision maker pattern for each of the historic opportunities based on the historic participation data, the respective decision maker pattern for each historic opportunity indicating: (i) for each respective opportunity timeline stage, a number of the electronic communications corresponding to the historic opportunity that the respective decision maker identified for the historic opportunity has been identified as a participant, and (iii) for each respective opportunity timeline stage, a number of the electronic communications corresponding to the historic opportunity that the respective decision maker identified for the historic opportunity has viewed;
generating contact patterns for a current opportunity, wherein (i) the current opportunity corresponds to a sales opportunity for a product or service between the first enterprise and a target entity; (ii) the current opportunity has a respective current opportunity timeline that is defined by the series of opportunity timeline stages; and (iii) each contact pattern corresponds to a respective contact that has been identified as an individual associated with the target entity,
wherein generating the contact patterns comprises:
acquiring current opportunity participation data, including: (i) automatically extracting, from an enterprise email server, data for electronic communications exchanged between the first enterprise and the target entity, the target entity communication activity data including: (a) IDs of participants included in address fields of the electronic communications; and (b) timestamp data for the electronic communications; and (ii) receiving pixel image data indicating when at least some of the electronic communications exchanged between the first enterprise and the target entity have been viewed; and
generating the contact pattern for each respective contact based on the current opportunity participation data, each contact pattern indicating: (i) for each respective opportunity timeline stage that has been completed or is in progress for the current opportunity, a number of the electronic communications corresponding to the current opportunity that the respective contact has been identified as a participant, and (iii) for each respective opportunity timeline stage that has been completed or is in progress for the current opportunity, a number of the electronic communications corresponding to the current opportunity that the respective contact has viewed; and computing, based on a comparison of the contact patterns for the current opportunity with the decision maker patterns, which of the plurality of contacts is a potential decision maker and storing information indicating the identity of the potential decision maker.

2. The method of claim 1 wherein the electronic communications include one or more of: email messages; and electronic invitations for meetings.

3. The method of claim 2 wherein the historic participation data indicates position titles of the decision makers and the current opportunity participation data indicates position titles of the contacts.

4. The method of claim 1 wherein the computing, based on the comparison of the contact patterns for the current opportunity with the decision maker patterns comprises:
    computing, for each of the contact patterns a similarity of the contact pattern with each of the decision maker patterns; and
    ranking the contacts as potential decision makers based on the computed similarities.

5. The method of claim 4 wherein the computing, based on the comparison of the contact patterns for the current opportunity with the decision maker patterns, comprises selecting a set of the contacts having the highest rankings as potential decision makers, the method further comprising, prior to storing information indicating the identity of the potential decision maker, presenting the set of contacts through a user interface and receiving user input indicating at least one of the group as the potential decision maker,
    wherein storing information indicating the identity of the potential decision maker comprises storing the information in the electronic database as part of a record for the current opportunity.

6. The method of claim 1 wherein the computing, based on the comparison of the contact patterns for the current opportunity with the decision maker patterns comprises inputting the contact patterns to a neural network model that has been trained based on the decision maker patterns, the neural network model being configured to output a respective probability value for each of the plurality of contact patterns indicating a predicted likelihood that the contact pattern corresponds to a decision maker.

7. The method of claim 1 wherein the current opportunity is an open opportunity and the method is performed during a duration of the open opportunity.

8. A computer system comprising:
    a processor;
    a non-volatile storage coupled to the processor and including software instructions that, when executed by the processor, configure the computer system to perform a method comprising:
    generating decision maker patterns for a plurality of historic opportunities, wherein (i) each historic opportunity corresponds to a sales opportunity for a product or service between a first enterprise and a respective external entity; (ii) each historic opportunity has a respective opportunity timeline that is defined by a series of opportunity timeline stages between a respective start date for the historic opportunity and a respective closing date for the historic opportunity;
    wherein generating the decision maker patterns comprises:
        retrieving, from an electronic database, historic participation data for the plurality of historic opportunities, the historic participation data comprising, for each historic opportunity: (i) IDs of individual users from the first entity that have been identified as associated with the historic opportunity; (ii) IDs of individual contacts from the respective external entity that have been identified as associated with the historic opportunity; (iii) ID of a person from the respective external entity that has been identified as a respective decision maker for the historic opportunity; (iv) opportunity timeline data associating time periods of the historic opportunity with respective opportunity timeline stages; and (v) electronic communication activity data for electronic communications exchanged between the first enterprise and the respective external entity corresponding to the historic opportunity, including: (a) IDs of participants included in address fields of the electronic communications; (b) timestamp data for the electronic communications; and (c) tracking pixel image data indicating when at least some of the electronic communications have been viewed; and
        generating a respective decision maker pattern for each of the historic opportunities based on the historic participation data, the respective decision maker pattern for each historic opportunity indicating: (i) for each respective opportunity timeline stage, a number of the electronic communications corresponding to the historic opportunity that the respective decision maker identified for the historic opportunity has been identified as a participant, and (iii) for each respective opportunity timeline stage, a number of the electronic communications corresponding to the historic opportunity that the respective decision maker identified for the historic opportunity has viewed;
    generating contact patterns for a current opportunity, wherein (i) the current opportunity corresponds to a sales opportunity for a product or service between the first enterprise and a target entity; (ii) the current opportunity has a respective current opportunity timeline that is defined by the series of opportunity timeline stages; and (iii) each contact pattern corresponds to a respective contact that has been identified as an individual associated with the target entity,
    wherein generating the contact patterns comprises:
        acquiring current opportunity participation data, including: (i) automatically extracting, from an enterprise email server, data for electronic communications exchanged between the first enterprise and the target entity, the target entity communication activity data including: (a) IDs of participants included in address fields of the electronic communications; and (b) timestamp data for the electronic communications; and (ii) receiving pixel image data indicating when at least some of the electronic communications exchanged between the first enterprise and the target entity have been viewed; and
        generating the contact pattern for each respective contact based on the current opportunity participation data, each contact pattern indicating: (i) for each respective opportunity timeline stage that has been completed or is in progress for the current opportunity, a number of the electronic communications corresponding to the current opportunity that the respective contact has been identified as a participant, and (iii) for each respective opportunity timeline stage that has been completed or is in progress for the current opportunity, a number of the electronic communications corresponding to the current opportunity that the respective contact has viewed; and computing, based on a comparison of the contact patterns for the current opportunity with the decision maker patterns, which of the plurality of contacts is a potential decision maker and storing information indicating the identity of the potential decision maker.

9. A non-transitory computer readable medium storing software instructions that, when executed by a processor, configure the processor to perform a method of:

generating decision maker patterns for a plurality of historic opportunities, wherein (i) each historic opportunity corresponds to a sales opportunity for a product or service between a first enterprise and a respective external entity; (ii) each historic opportunity has a respective opportunity timeline that is defined by a series of opportunity timeline stages between a respective start date for the historic opportunity and a respective closing date for the historic opportunity;

wherein generating the decision maker patterns comprises:

retrieving, from an electronic database, historic participation data for the plurality of historic opportunities, the historic participation data comprising, for each historic opportunity: (i) IDs of individual users from the first entity that have been identified as associated with the historic opportunity; (ii) IDs of individual contacts from the respective external entity that have been identified as associated with the historic opportunity; (iii) ID of a person from the respective external entity that has been identified as a respective decision maker for the historic opportunity; (iv) opportunity timeline data associating time periods of the historic opportunity with respective opportunity timeline stages; and (v) electronic communication activity data for electronic communications exchanged between the first enterprise and the respective external entity corresponding to the historic opportunity, including: (a) IDs of participants included in address fields of the electronic communications; (b) timestamp data for the electronic communications; and (c) tracking pixel image data indicating when at least some of the electronic communications have been viewed; and generating a respective decision maker pattern for each of the historic opportunities based on the historic participation data, the respective decision maker pattern for each historic opportunity indicating: (i) for each respective opportunity timeline stage, a number of the electronic communications corresponding to the historic opportunity that the respective decision maker identified for the historic opportunity has been identified as a participant, and (iii) for each respective opportunity timeline stage, a number of the electronic communications corresponding to the historic opportunity that the respective decision maker identified for the historic opportunity has viewed;

generating contact patterns for a current opportunity, wherein (i) the current opportunity corresponds to a sales opportunity for a product or service between the first enterprise and a target entity; (ii) the current opportunity has a respective current opportunity timeline that is defined by the series of opportunity timeline stages; and (iii) each contact pattern corresponds to a respective contact that has been identified as an individual associated with the target entity, wherein generating the contact patterns comprises:

acquiring current opportunity participation data, including: (i) automatically extracting, from an enterprise email server, data for electronic communications exchanged between the first enterprise and the target entity, the target entity communication activity data including: (a) IDs of participants included in address fields of the electronic communications; and (b) timestamp data for the electronic communications; and (ii) receiving pixel image data indicating when at least some of the electronic communications exchanged between the first enterprise and the target entity have been viewed; and generating the contact pattern for each respective contact based on the current opportunity participation data, each contact pattern indicating: (i) for each respective opportunity timeline stage that has been completed or is in progress for the current opportunity, a number of the electronic communications corresponding to the current opportunity that the respective contact has been identified as a participant, and (iii) for each respective opportunity timeline stage that has been completed or is in progress for the current opportunity, a number of the electronic communications corresponding to the current opportunity that the respective contact has viewed; and computing, based on a comparison of the contact patterns for the current opportunity with the decision maker patterns, which of the plurality of contacts is a potential decision maker and storing information indicating the identity of the potential decision maker.

* * * * *